United States Patent [19]
Lowry

[11] Patent Number: 5,953,724
[45] Date of Patent: Sep. 14, 1999

[54] GLOBAL DATABASE LIBRARY DATA STRUCTURE FOR HIERARCHICAL GRAPHICAL LISTING COMPUTER SOFTWARE

[75] Inventor: David D. Lowry, Medford, Oreg.

[73] Assignee: Lowry Software, Incorporated, Medford, Oreg.

[21] Appl. No.: 08/977,366

[22] Filed: Nov. 24, 1997

[51] Int. Cl.[6] .................................................. G06F 17/30
[52] U.S. Cl. .................................. 707/102; 707/2; 707/3; 707/10; 707/100; 707/103; 345/346; 345/353; 345/356
[58] Field of Search ........................... 707/2, 3, 10, 100, 707/102, 103; 345/346, 353, 356

[56] References Cited

U.S. PATENT DOCUMENTS

| | | |
|---|---|---|
| 4,831,543 | 5/1989 | Mastellone ............................. 364/489 |
| 5,307,484 | 4/1994 | Baker et al. ............................ 395/600 |
| 5,388,196 | 2/1995 | Pajak et al. ............................. 395/153 |
| 5,442,784 | 8/1995 | Powers et al. .......................... 395/600 |
| 5,652,884 | 7/1997 | Palevich ................................. 395/651 |
| 5,809,497 | 9/1998 | Freund et al. ............................... 707/2 |

Primary Examiner—Thomas G. Black
Assistant Examiner—Jean R. Homere
Attorney, Agent, or Firm—ipsolon llp

[57] ABSTRACT

A global database library contains multiple records from which a hierarchical graphical listing or chart can be formed. Each record includes a set of generic key fields and a Type field that allows the generic key fields to assume or represent different characteristics according to the value or data in Type field. The type field allows the single set of generic key fields to correspond to different types of information for the different records of different organizations, for example.

17 Claims, 14 Drawing Sheets

GLOBAL DATABASE LIBRARY DATA STRUCTURE FOR HIERARCHICAL GRAPHICAL LISTING COMPUTER SOFTWARE

FIELD OF THE INVENTION

The present invention relates to presenting information to computer users and, in particular, to a global database library data structure for use in providing a dynamic and hierarchical representation of information.

BACKGROUND AND SUMMARY OF THE INVENTION

Computer users today are inundated with information, information sources, programs and ways of communicating, which are referred to herein simply as information. Users find it increasingly difficult to find the information they desire as increasing amounts of information become available. These difficulties are particularly acute with regard to obtaining information from a database data source. Common computer software tools typify these difficulties.

In text-based computer systems, information is provided generally through lists. The lists may be names of available information, and the names may be organized either arbitrarily or alphabetically/numerically. Virtually any text-based organization of information is generally a one-dimensional linear sequence. To overcome the limits of such organization, computer systems have been developed to provide users with graphical representations of information.

In a conventional windowed computer environment information is often organized and represented in a graphical manner that can be implemented in any of a number of ways. A desktop or window in a windowed computer environment may include a group of icons that represent information, such as computer applications or data files. The icons might be arranged or grouped manually by the user or, in some cases, might be arranged in alphabetical or numerical order according to their names or titles. Another way of presenting information is a toolbar, which is one or more linear sequences of graphical buttons or icons. Yet another way of representing information is with tabs, which are analogous to paper file tabs, which are displayed simultaneously for a user to select to access information associated with the tab.

Each of these graphical representations of information provides a two-dimensional organization that extends beyond the typically one-dimensional organization used in text-based systems. Despite allowing increased amounts of information to be presented to a user, such graphical representations do not always improve upon the organization of the information being presented. Rather, the increased amounts of information that can be presented in such graphical two-dimensional representations allows so much information to be presented that it can be overwhelming or meaningless to some users.

Some applications have improved the way in which large amounts of information are presented to a user. One example is the file manager Explorer™ used in the Windows 95/NT operating systems. This file manager provides an outline-style graphical representation that indicates hierarchical relationships between data storage drives, file directories or folders, and files. The listing of information at each level is generally in alphabetical or numerical sequence. For an entry at a given level, such as a particular file directory or folder, the information at the next level down may be displayed (e.g., subdirectories, subfolders, or files).

Such hierarchical graphical listings provide a user with the hierarchical sequence or path required to locate or to access a file, folder, or directory. The hierarchical listings correspond to the file organization structure utilized by many computers, and the graphical representation of the listings conveys the hierarchical relationships. However, these hierarchical graphical listings are limited in several respects.

The hierarchical graphical listing of computer file directories represents the manner in which information is organized within a computer. While a user can establish computer file directories that group selected types of information together, the relationships between directories are fairly limited. For example, even hierarchical graphical listings of computer file directories rely primarily on alphabetical or numerical sequencing of directories. With large amounts of information, such limited relationships are inadequate to help users understand relationships between the groups of information.

Another limitation is that computer file directories organize computer files rather than the information in the computer files. Organizing information in this way forces the user to focus not on the underlying information of interest but rather on the technological artifact of computer files.

In one implementation of the present invention, therefore, hierarchical graphical listing computer software resides in a computer readable medium and obtains data for and renders hierarchical graphical listings or charts. A hierarchical graphical listing or chart rendered on a display according to this invention includes multiple nodes that are at different hierarchical levels and may include connecting branches that represent hierarchical links.

Each of the nodes is active and has an action associated with it so that the action is integrated into the information in the listing. For reference purposes, the actions may be grouped as Display Actions, View/Play Actions, Editing Actions, and Other Actions. The hierarchical graphical listing computer software of this invention allows information to be presented to users in a format that improves understanding of the relationships between the information. Examples of the types of information that can be provided include: the hierarchical levels of an organization such as a corporation, government, etc., relationships between the locations (e.g., nations, states, counties, cities, etc.) of people or entities, relationships between components within an article, machine, or software program, relationships between information sources such as computer files, sites on local or global computer networks, printed materials, etc., as well as virtually any other types of information having hierarchical relationships.

Such hierarchical graphical listings allow simple retrieval of information from a complex database record having plural fields. Another aspect of this invention is a global database library that contains multiple records from which a hierarchical graphical listing or chart can be formed. Each record includes a set of generic key fields and a Type field that allows the generic key fields to assume or represent different characteristics according to the value or data in Type field. The type field allows the single set of generic key fields to correspond to different types of information for the different records of different organizations, for example.

A benefit of the generic key fields is that a particular record does not require data entries within fields having null values for the record, even for a database representing an organizational structure. A conventional database record corresponding to such an organizational structure would typically require that a record have an entry for each level in the organization so that all entities in the structure are correlated with their correct hierarchical level. While adequate for records that conform to the standard organizational structure, such records become unwieldy and inaccurate for the many exceptions to such an organizational structure.

Additional objects and advantages of the present invention will be apparent from the detailed description of the preferred embodiment thereof, which proceeds with reference to the accompanying drawings.

DETAILED DESCRIPTION OF PREFERRED EMBODIMENT

Figure 1:
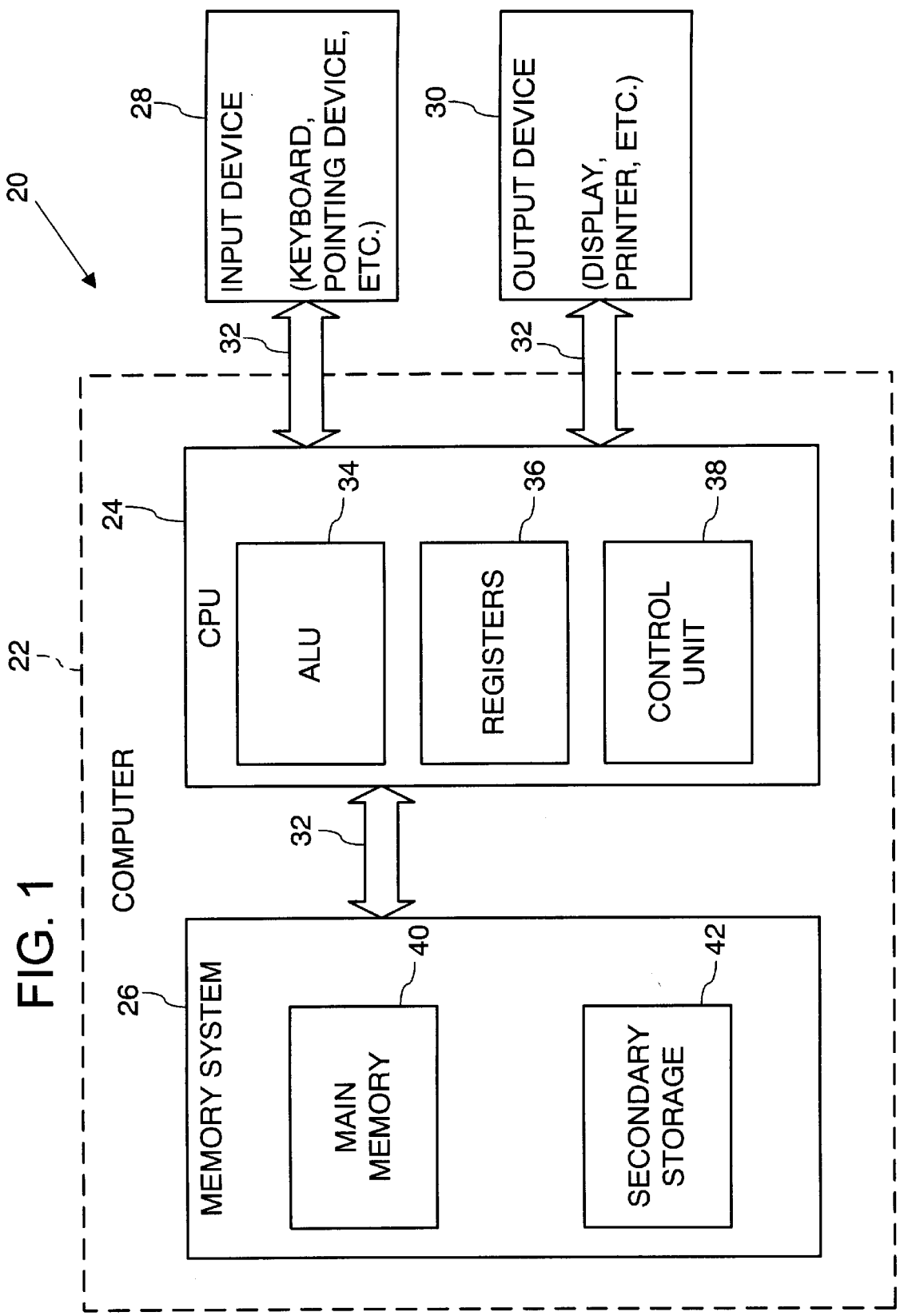
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a touchscreen or microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2A:
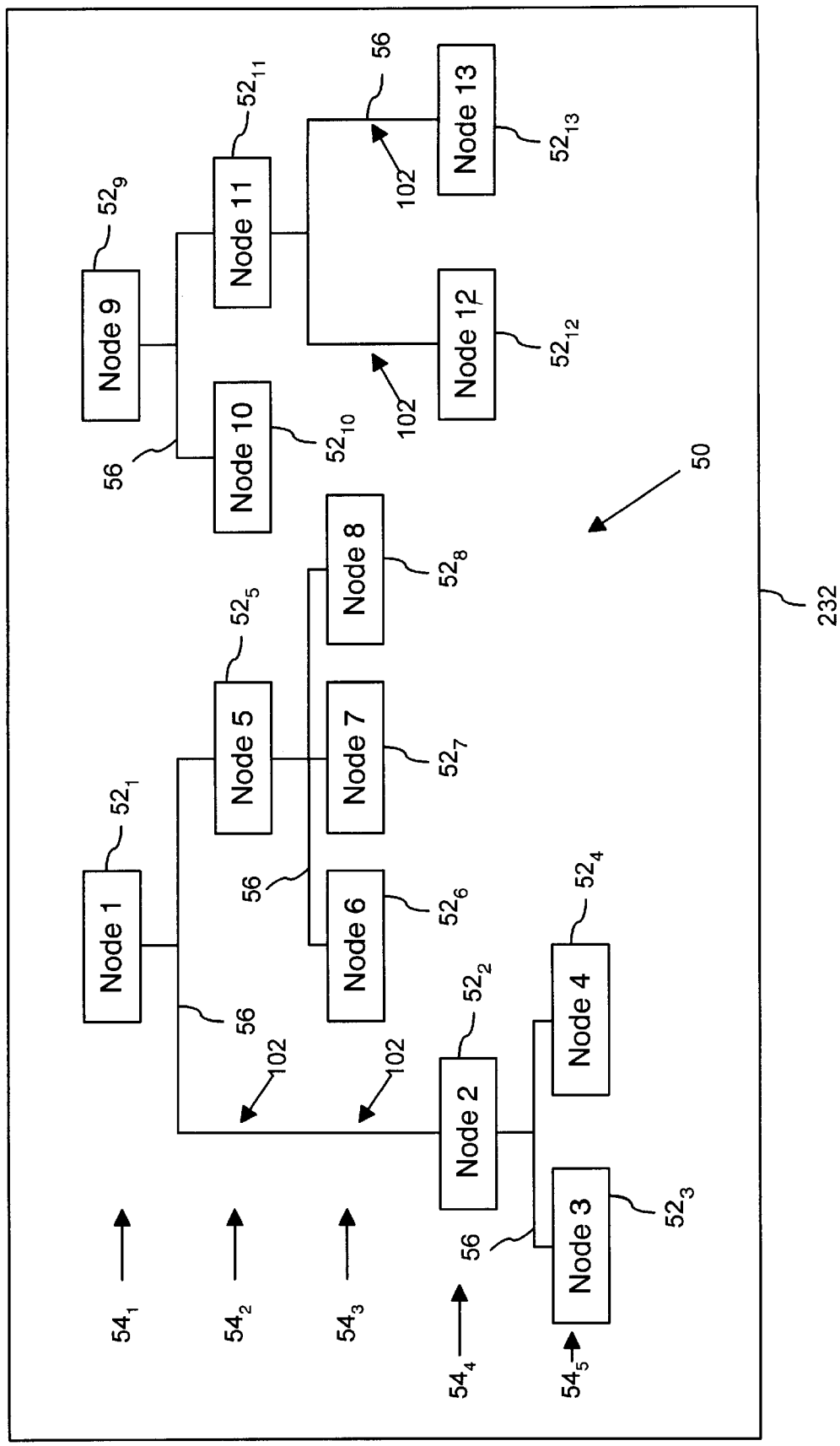
FIGS. 2A and 2B are diagrams illustrating an exemplary vertical format chart rendered on a display to represent a hierarchical graphical listing of related information.

FIG. 2A is a diagram illustrating an exemplary integrated active information document in the form of a vertical format chart 50 in which active control elements (e.g., nodes 52) are integrated into information provided in the document. Vertical format chart 50 is rendered on a display (e.g., output device 30) for a computer user to represent a hierarchical graphical listing of related information. Chart 50 includes multiple nodes 52 that are at different hierarchical levels 54 and include connecting branches 56 that represent hierarchical links. It will be appreciated that the particular hierarchical relationships depicted in FIG. 2A are illustrative and that chart 50 could include virtually any relationships between nodes 52, levels 54, and branches 56 according to the invention described herein. Nodes 52 that are at different hierarchical levels 54 and are linked by branches 56 are sometimes referred to as having parent/child relationships. A parent node (e.g., $52_2$) is at a hierarchically higher level (e.g., $54_4$) than the level (e.g., $54_5$) a child node (e.g., $52_3$).

Nodes 52 are labeled with a generic numeric nomenclature, but as applied to represent actual information nodes 52 would bear names corresponding to particular groups of types of information. Examples of the types of information that nodes 52 could represent include: the hierarchical levels of an organization such as a corporation, such as those listed in Table 1, or may allow a user to add or update information. Display of a network page may be used by a user to view an HTML file available on the Internet or an intranet, for example.

TABLE 1

| Action Class | Action Type | Action Function |
| --- | --- | --- |
| Display Actions | | |
| | Public menu | Display a public menu |
| | Private menu | Display a private menu |
| | Public chart | Display a public chart |
| | Private chart | Display a private chart |
| | Active form | Display an active form |
| | Information form | Display an information form |
| | Update form | Display a file update form |
| | Net page | Show an HTML page which is local or on the Internet |
| View/Play Actions | | |
| | Play audio | Play an audio file |
| | View document | Display a document |
| | View picture | Display a picture |
| | View report | Display or print a report |
| | View video | Show a video |
| Editing Actions | | |
| | Edit audio | Edit an audio file |
| | Edit document | Edit a document such as a spreadsheet or word processor file |
| | Edit picture | Edit a picture |
| | Edit report | Edit a report |
| | Edit video | Edit a video |
| Other Actions | | |
| | Program | Run a program |
| | Contact | Place a call or send e-mail |
| | Document | Display a file based on its file suffix | government, etc., relationships between the locations (e.g., nations, states, counties, cities, etc.) of people or entities, relationships between components within an article, machine, or software program, relationships between information sources such as computer files, sites on local or global computer networks, printed materials, etc., as well as virtually any other types of information having hierarchical relationships.

Each of nodes 52 is active and has associated with it an action, and Table 1 lists an exemplary set of actions available for implementation from a node 52. For reference purposes, the actions are grouped as Display Actions, View/Play Actions, Editing Actions, and Other Actions. Display actions cause menus, charts, forms, and or network pages to be displayed and made available to a user. Menus are provided upon start-up of the computer software utilizing the present invention. A menu may be public and available to all users in a group or network, or may be private and available only to one or more selected users. A menu may include multiple active nodes that might or might not have any hierarchical relationship between them. Each node on a menu may have associated with it one of the actions in Table 1. Moreover, both public and private menus may include multiple hierarchical levels.

A chart is a hierarchical graphical listing of related information, such as exemplary chart 50 of FIG. 2A. A chart may be public and available to all users in a group or network, or may be private and available only to one or more selected users, or may be a series of charts linked together. A form displays information in formats other than as hierarchical graphical listings and may include active features, View/play actions cause a file of a selected file format to be opened, played, viewed, or run. Similarly, Editing actions cause such files to be edited. Other actions include running a program, activating a telephone call, sending e-mail, or displaying a particular file type and are analogous to view/play actions. However, the other actions relate to features that are conceptually different from simply viewing a file and are grouped separately for user convenience.

The hierarchical graphical listing provided by chart 50 is provided to or rendered for a user who navigates to the chart from an active node in a menu, another chart, or a form. The node would have associated with it either of the public chart or private chart actions in Table 1. The rendering of chart 50, including the hierarchical relationships between nodes 52 and the actions associated with them, is based upon a chart definition that is established according to this invention.

In one implementation, the information within chart 50 comes from a database data source or record having multiple fields (e.g., database table columns). Each field corresponds to a category of information in the database. The database includes multiple data records that each includes data in one or more of the fields. The database data source may be any of a variety of databases and database formats including Open Database Connectivity (ODBC) databases such as Access and SQL Server from Microsoft Corporation and Oracle from Oracle Corporation. For purposes of discussion and illustration, the following description makes reference to SQL server-based operations. It will be appreciated that these references are illustrative and do not limit the applicability of this invention to other databases or database formats.

Figure 3:
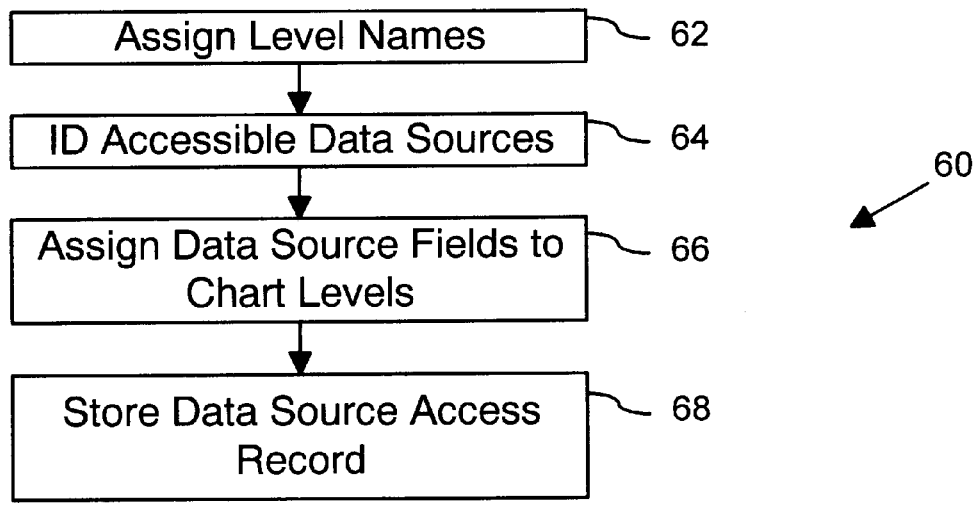
FIG. 3 is a flow diagram of a database association process for associating a chart with a database data source.

FIG. 3 is a flow diagram of a database association process 60 for associating a chart (e.g., chart 50) with a database data source. Association process 60 allows one or more charts to be used to access the data source as illustrated in FIG. 3.

Process block 62 indicates that each level in the chart is assigned a Level Name, which is equivalent to assigning a field name to that level. For example, in a chart of geographical locations the levels might be named "Country," "State," and "City."

Process block 64 indicates that one or more database data sources are identified as being accessible from the chart.

Process block 66 indicates that a field from the data source or data sources is assigned to each of the chart levels to form field/chart level assignments. In one implementation, the data type of the field is recorded so subsequent SQL statements can be properly constructed. Another implementation provides that the field in the data source record is to be compared to node codes or to node names of one or more levels.

Process block 68 indicates that the Level Name, identifications of the accessible databases, and the field/chart level assignments are stored in a data source access record.

Chart 50 can be one of multiple related charts that can be rendered from the multiple records and fields within the database record or data source. In addition, chart 50, either alone or in combination with one or more other charts, can be used to identify a particular set of records for retrieval from the database. This use of charts to identify records for retrieval from the database is referred to as chart navigation.

Figure 4:
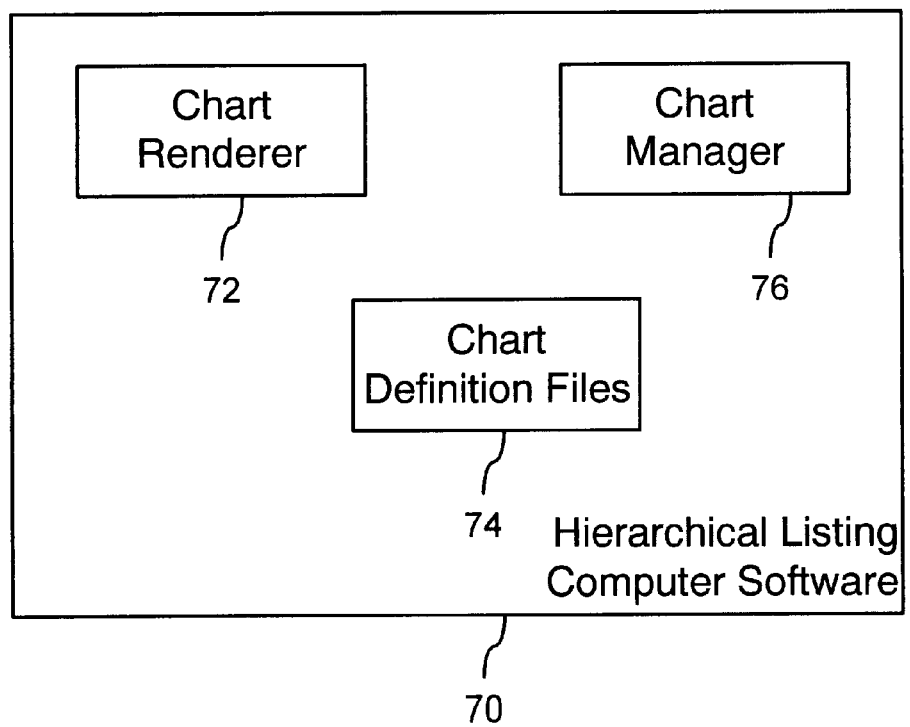
FIG. 4 is a block diagram of a hierarchical graphical listing computer software that obtains data for and renders hierarchical graphical listings or charts.

FIG. 4 is a block diagram of a hierarchical graphical listing computer software 70 that resides in a computer readable medium (e.g., memory system 26) and obtains data for and renders hierarchical graphical listings or charts such as chart 50. Hierarchical graphical listing software 70 includes a chart renderer 72 that renders charts (e.g., chart 50) according to information in the form of chart definition files 74 held in a computer readable medium (e.g., memory system 26). Chart definition files 74 may be generated by user in conjunction with a chart manager 76. Hierarchical graphical listing software 70, including chart renderer 72 and chart manager 76, may operate within a windowed user interface environment provided by an underlying operating system, for example.

Figure 5A:
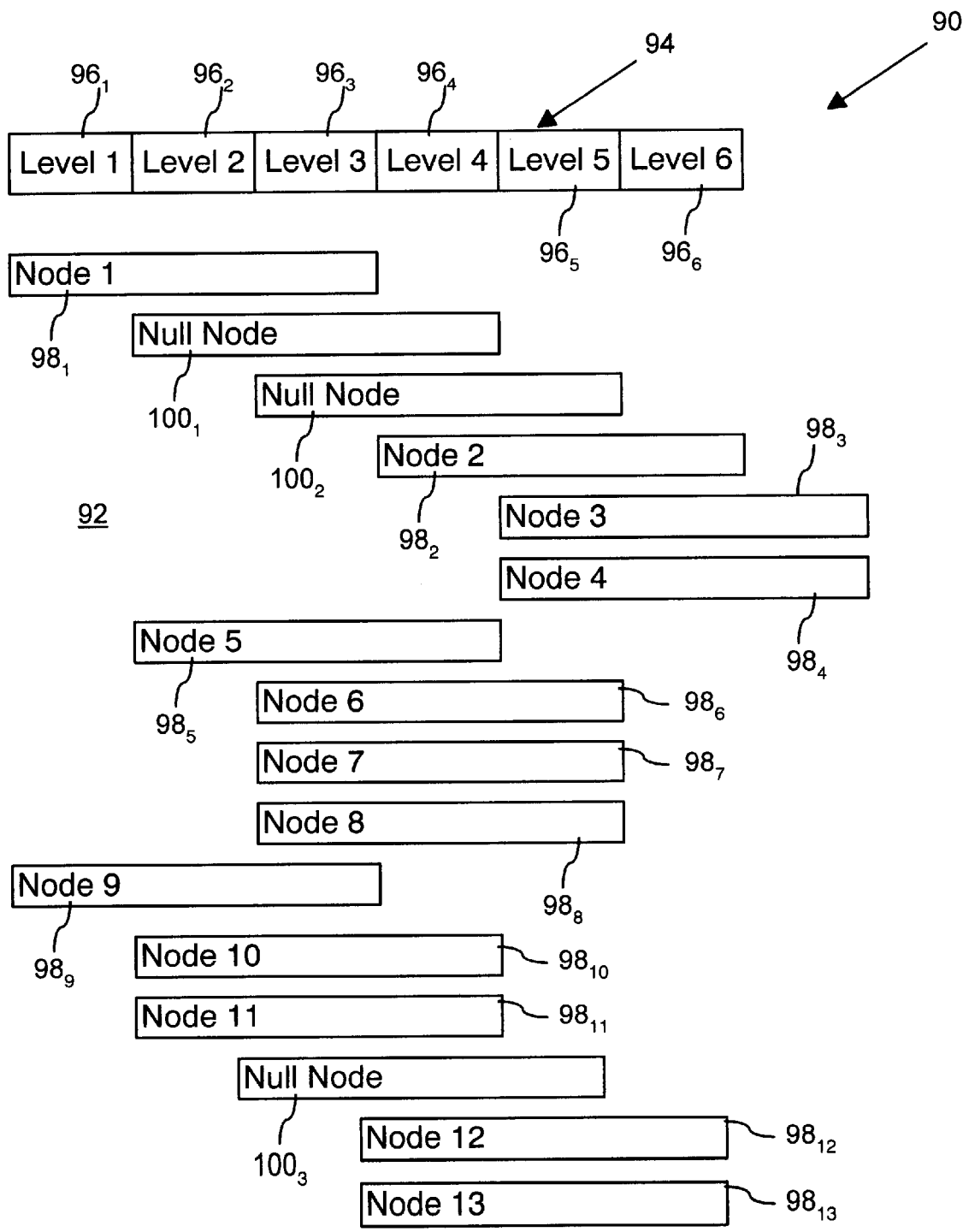
FIGS. 5A and 5B are illustrations of a graphical user interface for a chart manager component of the hierarchical graphical listing computer software of FIG. 3.

FIG. 5A is an illustration of a graphical user interface 90 for chart manager 76 of hierarchical graphical listing computer software 70 for establishing an outline-based definition 92 of a chart such as chart 50. Chart manager user interface 90 would typically be rendered in a windowed computer environment, for example.

Chart manager user interface 90 includes a hierarchical level bar 94 that defines multiple predetermined hierarchical levels 96 (e.g., levels $96_1$–$96_6$). Merely as convention, higher-numbered levels are deemed sub-levels and, hence, hierarchically lower than lower-numbered levels. A user positions multiple node lines 98 (e.g., $98_1$–$98_{13}$) relative to each other and the hierarchical levels 96 depicted in level bar 94 to define a chart such as chart 50. In this example, outline-based definition 92 depicted in FIG. 5A corresponds to the hierarchical graphical listings of chart 50 depicted in FIG. 2A.

Definition 92 is outline-based in that relationships between hierarchically related nodes 52 in chart 50 are established automatically between any preceding node line (e.g., $98_9$) and any subsequent node line (e.g., $98_{12}$) that is not of a hierarchical higher level than the preceding node line or for which there is no intervening node line of a higher level. By convention, subsequent node lines are listed after or below preceding ones in the orientation of chart manager component 76. In one implementation, chart manager user interface 90 supports both cut and paste function and drag and drop function by which a user can rearrange or move node lines 98, either singly or in groups.

For example, a user establishes outline-based definition 92 within chart manager user interface 90 by dragging and dropping node lines 98 into alignment with hierarchically related node lines and levels 96 to represent a desired hierarchical relationship. The user then names each node line 98 and associates desired actions such as those in Table 1 with appropriate node lines. Through the graphical user interface provided by chart manager 76, therefore, a user can combine the power of a wide variety of actions with the conceptual clarity and associations provided by a hierarchical graphical listing.

One aspect of chart manager user interface 90 is the automatic generation of null node lines 100 to fix or hold multi-level steps between immediately adjacent nodes 52 in a directly related hierarchical graphical listing. A null node (e.g., null nodes $100_1$ and $100_2$) is installed automatically by chart manager 76 for each additional level between a preceding node line (e.g., node line $98_1$) and a subsequent node line (e.g., node line $98_2$). For example, chart manager 76 installs null nodes 100 as the user "drags" or otherwise positions the subsequent node line below the next subsequent level below the preceding node line.

Null nodes 100 correspond to locations 102 in chart 50 of FIG. 2A. Null nodes 100 do not represent actual hierarchical components of chart 50 and are not rendered as nodes within it. Rather, null nodes 100 allow chart manager 76 to position groups of nodes at different hierarchical levels that correspond to the actual hierarchical relationships to be represented. For example, node $52_2$ corresponds to a level $96_4$ that is two levels below level $96_1$ of node $52_1$. Null nodes $100_1$ and $100_2$ function, therefore, as placeholders that allow chart 50 to be rendered with virtually arbitrary hierarchical relationships between its nodes 52.

Figure 2B:
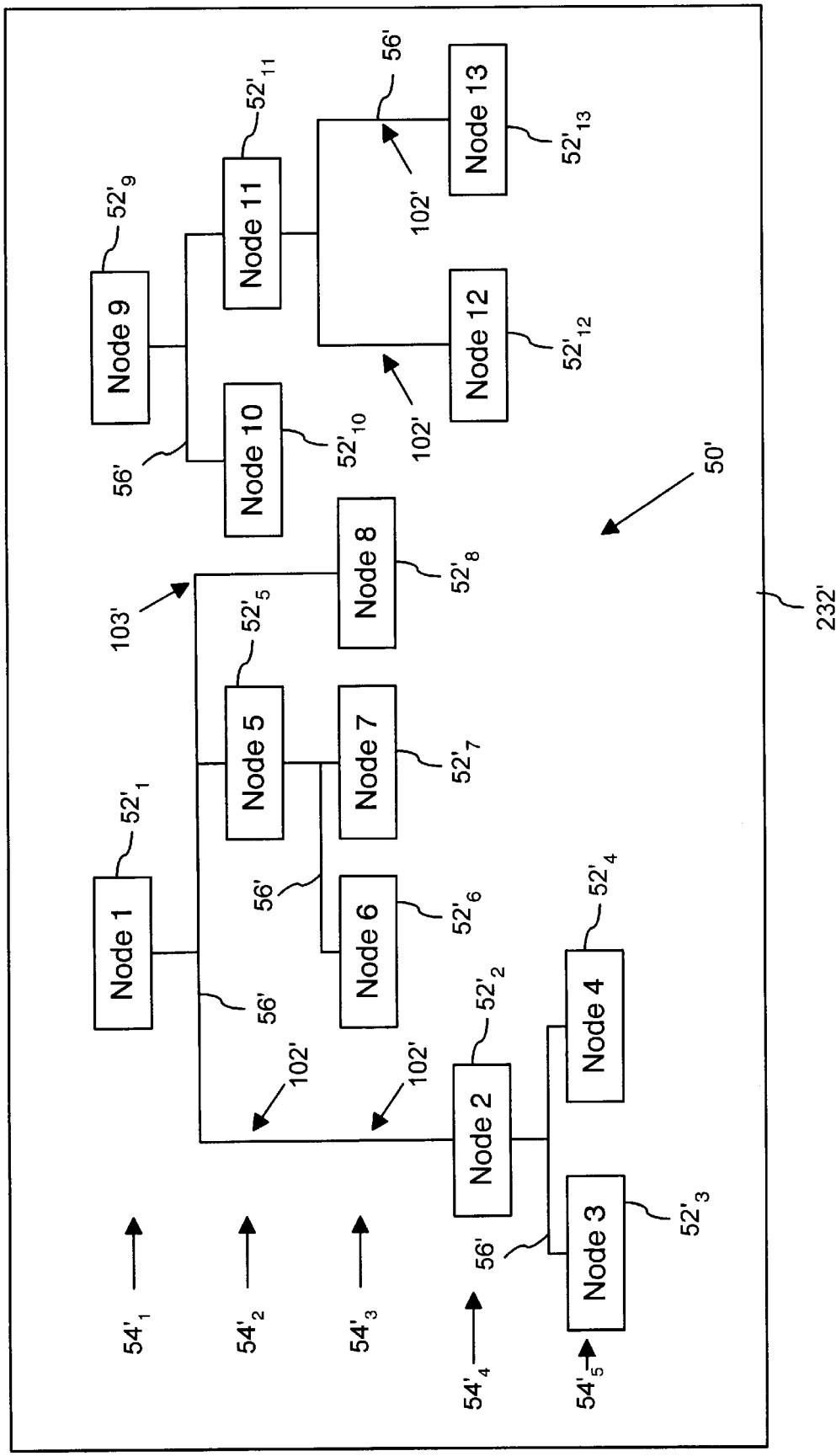
Figure 5B:
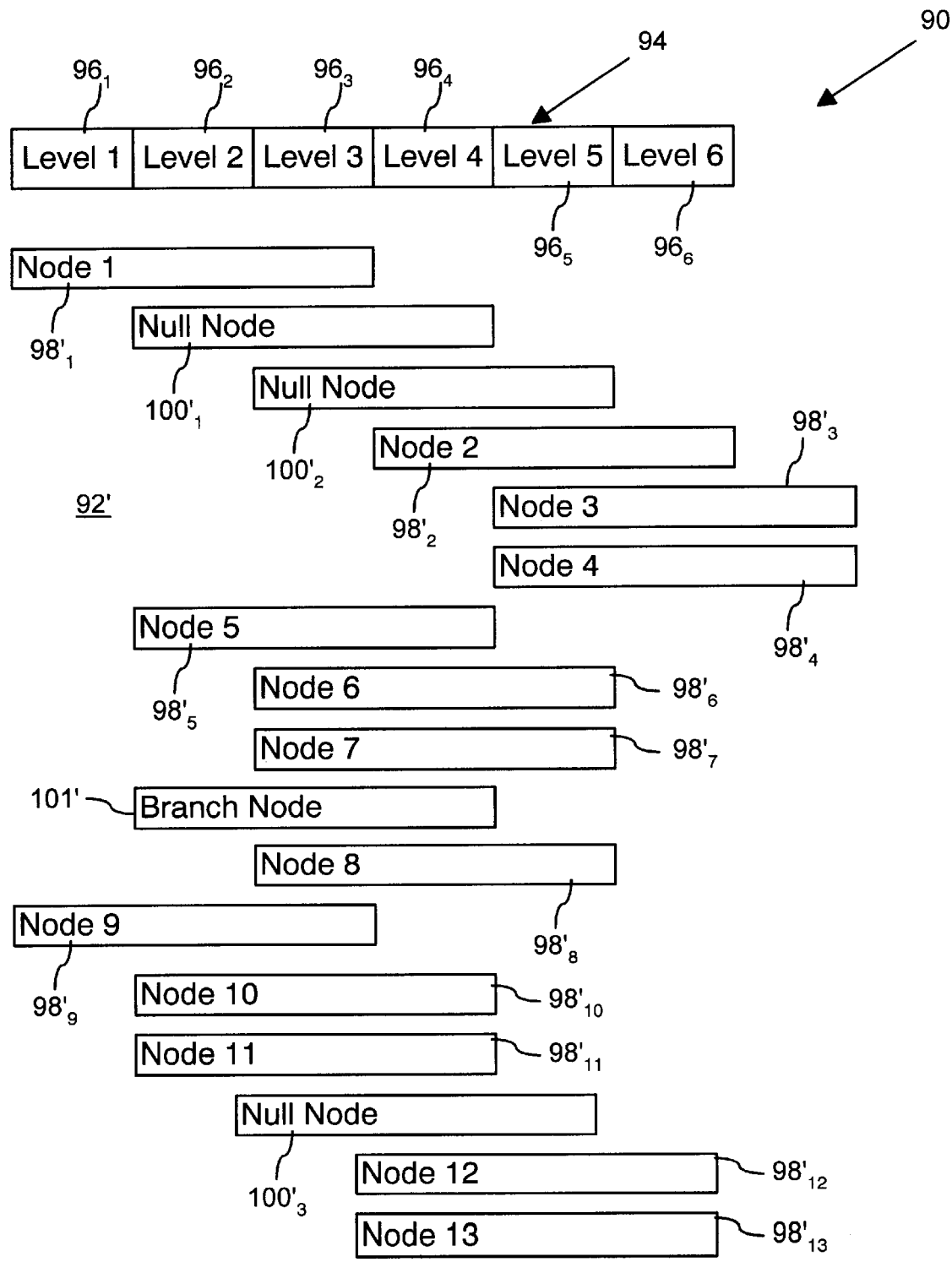

FIG. 5B is an illustration of graphical user interface 90 for chart manager 76 of hierarchical graphical listing computer software 70 for establishing an outline-based definition 92' of a chart such as a chart 50' illustrated in FIG. 2B. FIGS. 2B and 5B are similar to respective FIGS. 2A and 5A and use the same reference numerals, but components corresponding to the different charts 50 and 50' are distinguished with a prime designator in FIGS. 2B and 5B.

FIGS. 2B and 5B illustrate another node generating feature in addition to the automatic generation of null node lines 100'. The feature is a branch node 101' that is inserted by a user between higher and lower level nodes 52' (e.g., nodes $52_5$ and $52_8$) to break the direct hierarchical relationship that would otherwise occur between them. Branch node 101' functions to link exemplary node $52_8$ directly to node $52_1$, as shown in FIG. 2B. Like null nodes 100', branch nodes 101' do not represent actual hierarchical components of chart 50' and are not rendered as nodes within it. Rather, branch node 101' corresponds to a location 103' that allows a user to break direct hierarchical relationships based on the immediate adjacency of a higher level node so that the nodes correspond to the actual hierarchical relationships to be represented.

In accordance with the outline-based definition 92 of chart 50, chart manager 76 establishes a chart definition file with a record or data structure for each node 52. The record for each node 52, or node definition record, includes fields as set forth in Table 2.

TABLE 2

| Field | Description |
| --- | --- |
| Chart Id | This identifies the chart to which the node belongs. |
| Node Code | A code that identifies this node. |
| Node Name | A descriptive name that is displayed on the node when it is drawn. |
| Node Level | The chart level at which the node resides. |
| Parent Node Codes | Codes for all the nodes to which this node is a child. |
| Other Node Information | Nodes may have additional information such as an icon bitmap, a picture, an action or other properties depending on the type of chart and the desired characteristics of the particular node. |

The Chart Id field identifies the chart to which the node belongs and thereby correlates the record for a particular node with a particular chart. The Chart Id is useful in the general situation when the chart definition file contains definitions for more than one chart. The Node Code field identifies each node and may be a numeric indicator assigned to the node when it is defined. The Node Code for a node need be unique just as to other nodes having the same immediate parent node, thereby simplifying the avoidance of duplicate node codes. A user may choose to use complete uniqueness among all nodes. The Node Name is the descriptive name that is displayed on the node when it is drawn or rendered. In FIG. 2A, for example, the nodes have the generic names "Node 1," "Node 2," etc.

The Node Level indicates the hierarchical level at which the node is positioned. In FIG. 5A, for example, one of the six levels 96 is assigned to each node. The Parent Node Codes are a listing of all Node Codes for the nodes to which the particular node is a child (i.e., all nodes that are in a direct line of hierarchically higher levels). The Other Node Information is an open field in which various types of information may be held including links to an icon bitmap, a picture, an action or other properties. It will be appreciated that the Chart Ids, Node Codes, Node Levels, and Parent Node Codes contain the data structure for defining the relationships between the nodes of a hierarchical graphical listing according to the present invention.

Figures 6, 7A:
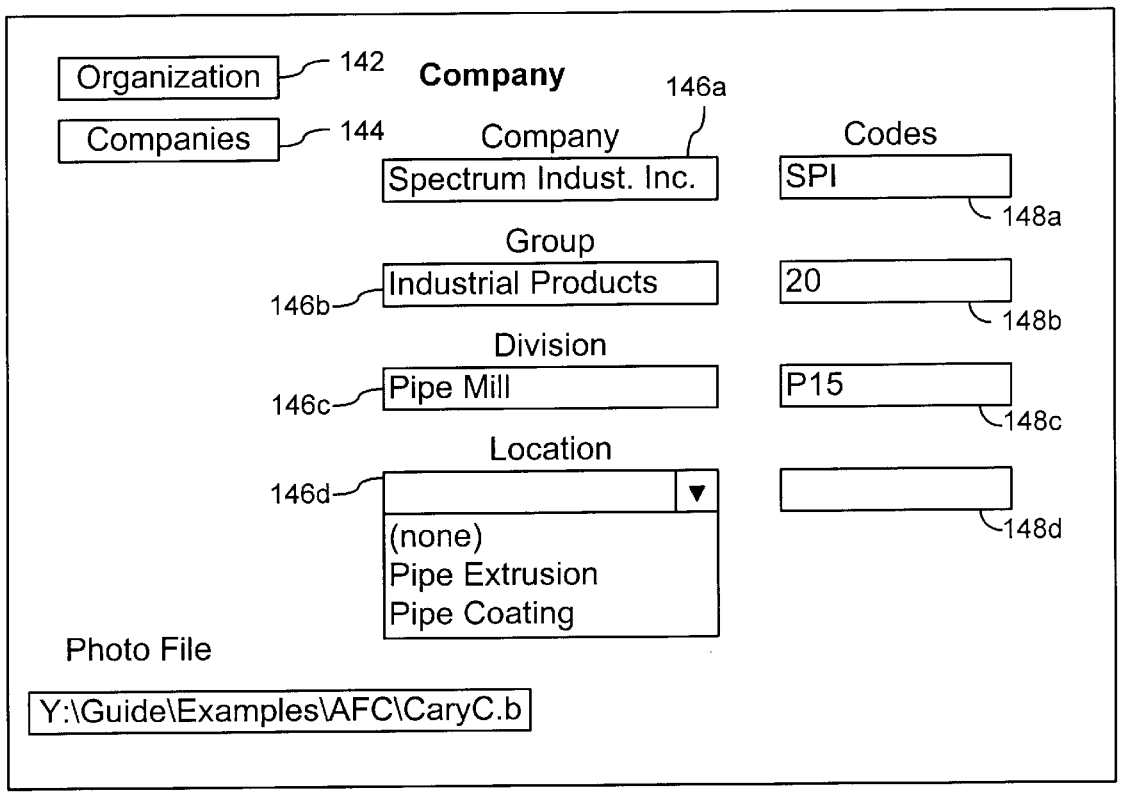
FIG. 6 illustrates a global database library data structure.
FIG. 7A is an illustration of an exemplary graphical user interface for a key field correlation panel.

FIG. 6 illustrates a global database library 120 that contains multiple records 122a, 122b, etc., (typically large numbers of records, only three shown) from which a hierarchical graphical listing such as chart 50 can be formed. Each record 122 includes a set of generic key fields 126 and a Type field 128 that allows generic key fields 126 to assume or represent different characteristics according to the value or data in Type field 128.

Generic key fields 126 for a particular record (e.g., 122b) correspond to different information according to the value in the Type field 128 of the record. The data or information in records 122 remains unchanged, but the associations by which fields 126 are used to form a chart 50 are changed. For n-number of generic key fields 126 (only 3 shown), they are each assigned a designation of from key-field-1 to key-field-n. The key-field designations are hierarchically related, with key-field-1 corresponding to a hierarchically highest level.

For purposes of illustration, chart 50 could be one of many charts used to represent the hierarchical levels of one or more organizations (e.g., a large corporation, its suppliers, customers, etc.), the people associated with the organizations, the locations (e.g., nations, states, counties, cities, etc.) of the people, organizations, as well as product information about products, product components, materials for the components, etc. Many other types of information could also be included.

Within each class or category of entity (e.g., organizations, people, locations) different entities often will have different hierarchical relationships. Within the organizations class, for example, different corporations would typically be organized differently. Global database library 120 allows such different hierarchical relationships to be stored and processed efficiently to form charts such as chart 50.

Type field 128 allows the single set of generic key fields 126 to correspond to different types of information for the different records 122 of a class or category of entity. Alternatively, the set of generic key fields 126 can correspond to different types of information for the different records 122 of multiple classes of entity. In both implementations, global database library 120 need not include a different field for every unique hierarchical relationship of an entity in the represented library.

A benefit of generic key fields 126 is that a particular record does not require data entries within fields 126 having null values for the record, even for a database representing an organizational structure. A conventional database record corresponding to such an organizational structure would typically require that a record have an entry for each level in the organization so that all entities in the structure are correlated with their correct hierarchical level. While adequate for records that conform to the standard organizational structure, such records become unwieldy and inaccurate for the many exceptions to such an organizational structure.

As a simple example, an organizational chart for a corporation might include records for employees, and the records could include indications of the corporate groups and divisions to which each employee is assigned. A conventional database record for this information would not accurately represent the organizational posture of, for example, the corporate President, who is not assigned to any group or division. A conventional database record would require at least two undesirable compromises.

First, every record in the database would have to include all the fields in the database, even though many of the fields might be null for many of the records in the database. This can enlarge a database unnecessarily and cause it to require additional computer resources for processing or may simply slow the processing of the database. Second, imprecise and arbitrary field designations must be made to accommodate the fields that would conceptually be null but that require values to accommodate the database requirements. In the present example, certain arbitrary designations would typically be assigned to the corporate President to provide non-null values to fields such as group and division. The disadvantage of such arbitrary designations is that they are time-consuming and subject to error.

With key fields 126 correlated with levels in a specified chart according to this invention, and the chart including in its definition null and branch nodes as described above, null values are acceptable within organizational records. It will be further appreciated that reorganization of such nodes in the context of chart manager 76 is simplified because key-field associations are simply shifted when modifications are made with, for example, the cut and paste or drag and drop functions. As a result, global database library 120 is smaller and more efficient than a conventional database table and correlating global database library 120 with a hierarchical graphical listing such as chart 50 is simplified.

In one implementation, the Chart Id described with reference to Table 2 is used in Type field 128. The Chart Id identifies a particular chart that is represented, for example, by a chart definition file. The chart definition file includes information about nodes, node levels, and parent nodes that define the chart (e.g., 50). With the Chart Id of a particular chart in Type field 128 of a record 122, generic key fields 126 of the record are associated with particular levels of the chart. The levels of a chart may themselves be considered fields (i.e., level fields) that are associated with the chart.

Figure 7B:
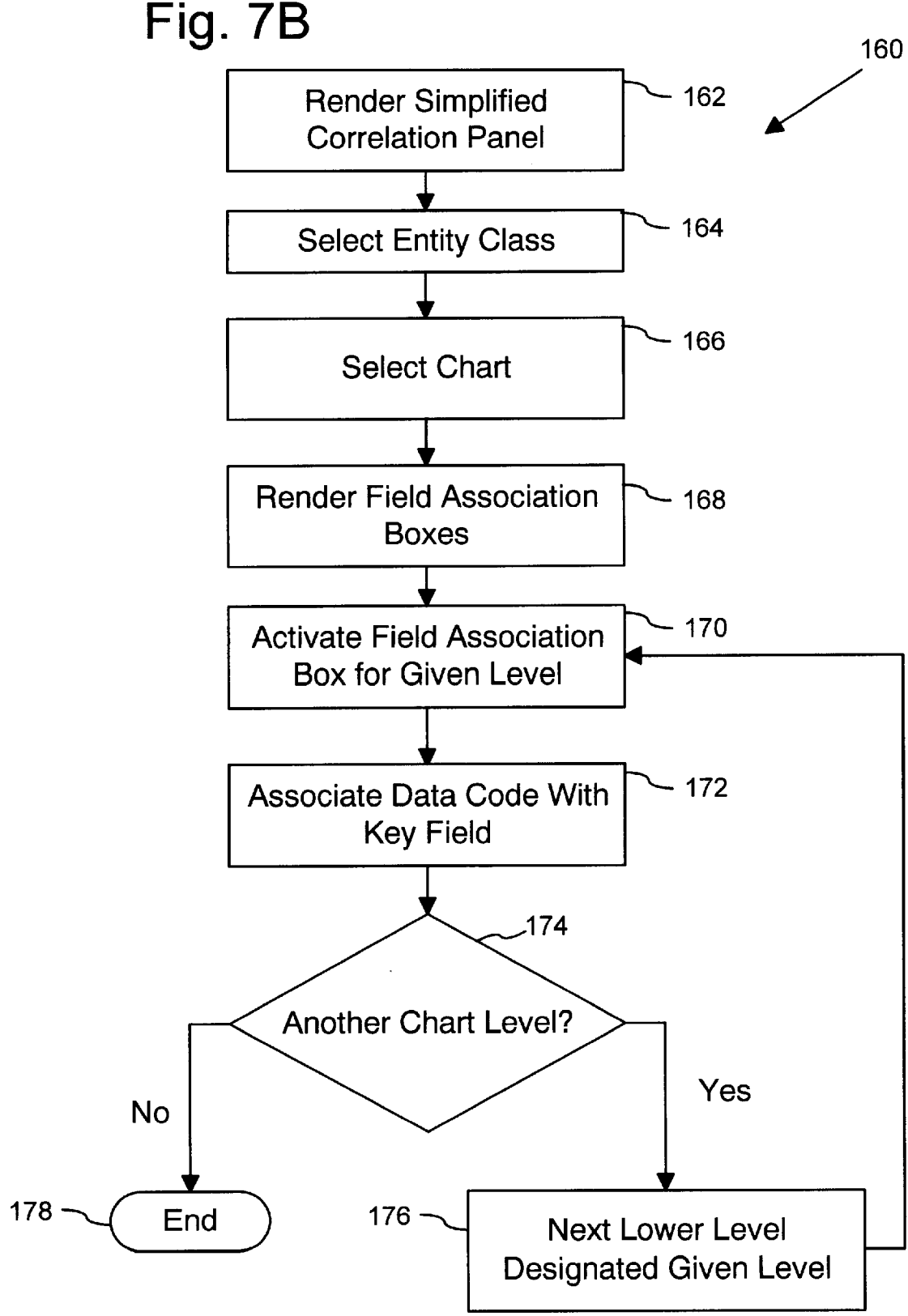
FIG. 7B is a flow diagram of a key field correlation process.

FIG. 7A is an illustration of an exemplary graphical user interface for a key field correlation panel 140 by which a user can associate generic key fields 126 in a record with levels or level fields of a chart. Correlation panel 140 could be used, for example, when correlating a new record with a particular chart. Correlation panel 140 includes an entity class box 142, a chart box 144 and one or more key field association boxes 146. Field association blocks 146 may have optional corresponding code boxes 148 as well. Correlation panel 140 is described in greater detail with reference to a key field correlation process 160 shown in FIG. 7B.

Process block 162 indicates that a simplified correlation panel 140 is rendered with class box 142 and chart box 144. Field association boxes 146 are either not rendered or rendered but with an indication that they are inactive.

Process block 164 indicates that a user selects an entity class for which a chart is to be associated with a particular record 122. For example, the entity classes could include Organization, Location, People, Product, etc. The class may be selected from a list of classes that are rendered in a drop-down list box (shown with field association box 146d) extending from chart box 142. The name of the selected class (e.g., Organization) is then inserted into class box 142.

Process block 166 indicates that a user selects a chart to be associated with the particular record 122. For example, the chart may be selected from a list of chart titles that are rendered in a drop-down list box extending from chart box 144. The title of the selected chart (e.g., Companies) is then inserted into chart box 144.

Process block 168 indicates that multiple field association boxes 146 are rendered with level field titles corresponding to the titles of levels (or level fields) within the selected chart. If field association boxes 146 were originally rendered but with an indication that they are inactive, the boxes are shown to be active and the level field titles are rendered. In one implementation, the number of field association boxes 146 is the same as the number of levels (or level fields) within the selected chart and are ordered according to their key-field designations (e.g., box 146a is key-field-1, box 146b is key-field-2, etc.).

Process block 170 indicates that the association box 146 for a given level is activated and a list of node names (or codes in the corresponding box 148) at that level is made available in a drop-down list box extending from the association box 146 (or code box 148). The list of node names (or codes) made available at that level is based upon prior selections or associations made by the user. In an initial pass through this process step association box 146a for the highest hierarchical level is activated. In the illustration of FIG. 7A, the highest level (Level 1) of the selected chart corresponds to the field "company," and a user has associated the data "Spectrum Industries, Inc." in the record with that field.

Process block 172 indicates that a code corresponding to the associated data is retrieved and incorporated in or associated with the key-field for the given level. As illustrated in FIG. 7A, the code may also be displayed in a code box 148. In another implementation, the user could directly select the code from code box 148 in the same manner that the association selection is from association box 146.

Query block 174 represents an inquiry as to whether there is another chart level to be associated. If there is another chart level to be associated with the record, query block 174 proceeds to process block 176. If there is not another chart level to be associated with the record, query block 174 proceeds to termination block 178.

Process block 176 indicates that the next lower hierarchical level is designated the given level. Process block 176 returns to process block 170.

Key field correlation process 160 shows how correlation panel 140 can be used to correlate data in a new record with the node levels of a particular chart. Correlation panel 140 and process 160 also illustrate how generic key fields 126 and Type field 128 of global database library 120 provide versatility in representing a hierarchical graphical listing such as chart 50 from the data fields of a record.

Despite the foregoing description relating to global database library 120, it will be appreciated that charts such as chart 50 can be rendered with reference either to global database library 120 or a conventional database record. Similarly, it will be appreciated that accessing of information corresponding to a chart may operate in substantially the same manner whether the underlying database is conventional or a global library.

Figure 8:
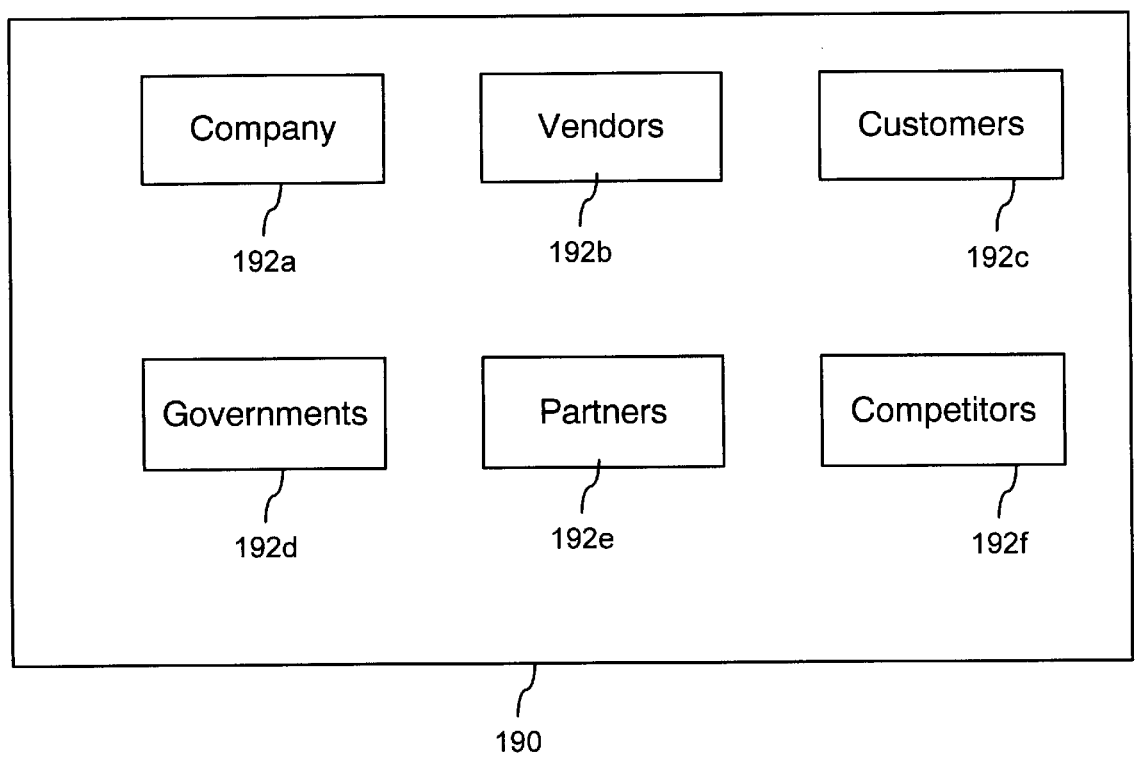
FIG. 8 is an illustration of an exemplary master chart having nodes of a single hierarchical level corresponding to multiple user-selectable charts available from a global database library

FIG. 8 shows an exemplary master chart 190 having nodes 192 of a single hierarchical level corresponding to multiple user-selectable charts available from a global database library 120. As described above, each record in the global database library 120 has a Type field 128 that contains a Chart Id corresponding to a particular chart. A chart (e.g. 192c) selected from master chart 190 effects a database query on the corresponding global library directed to the corresponding Chart Id. In an implementation utilizing an SQL server format, for example, selection of a chart 192 from master chart 190 results in the following SQL statement:

WHERE ChartId=<the chart's Id>AND KeyField1= <node code for level 1>AND KeyField2=<node code for level 2>. . .

It will be appreciated, therefore, that Master chart 190 provides a user with convenient access to the charts represented in the global database library 120.

Figure 9:
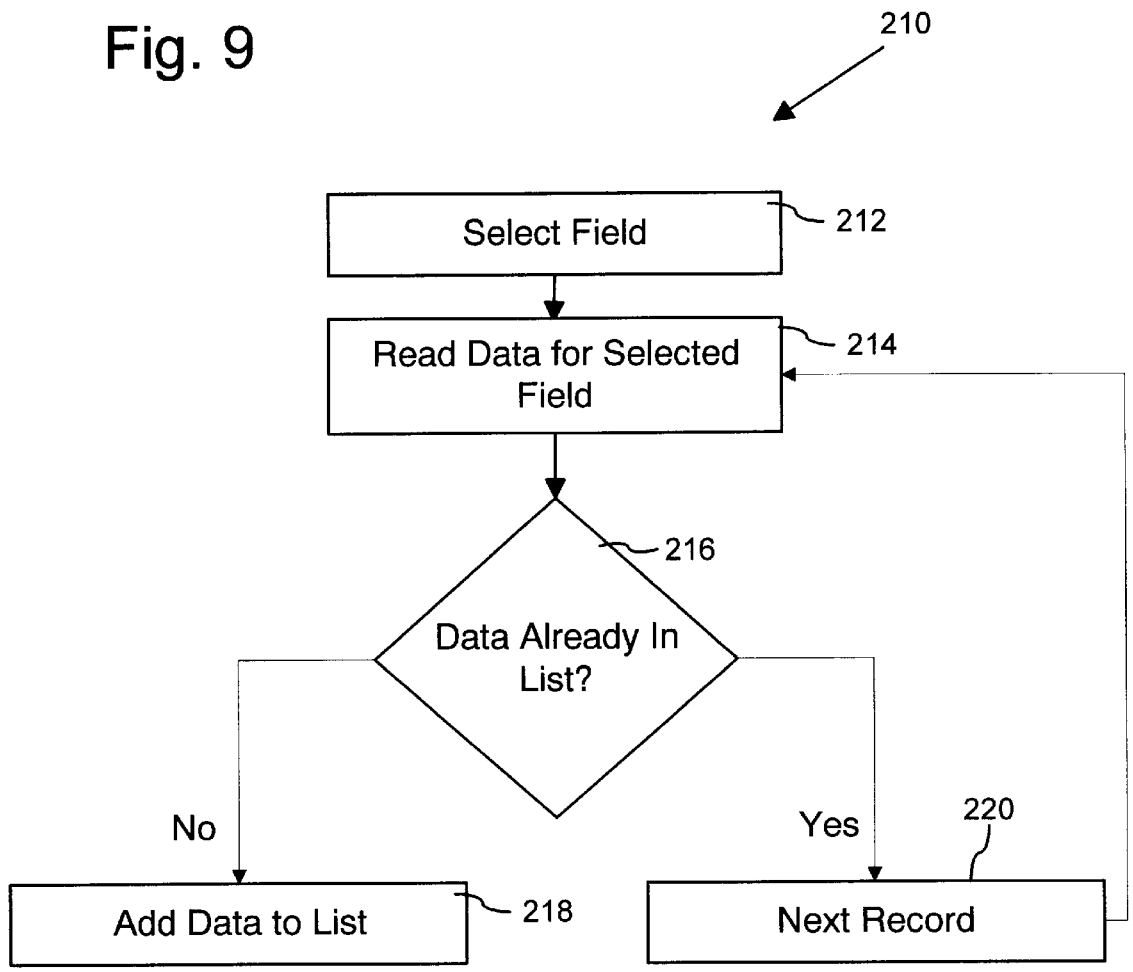
FIG. 9 is a flow diagram illustrating an automatic list generation process that generates a distilled or compiled list of the data entries within a field in a database table.

FIG. 9 is a flow diagram illustrating an automatic list generation process 210 that generates a distilled or compiled list of the data entries within a field in a database table. The list includes one occurrence of each of the entries within the field. For example, a database table of employee home addresses for a nationwide company could include a field State. Automatic list generation process 210 would generate a listing of all the states in which the company has employees. Even if the company has thousands of employees, there would be no more than 50 entries in the state listing. List generation process 210 allows information to be obtained from database records for simplified generation of other charts.

Process block 212 indicates that a field is selected by a user for automatic generation of a list.

Process block 214 indicates that the data in the selected field for a given record is read.

Query block 216 represents an inquiry as to whether the data from the given record is in a list of data entries being compiled from the database. If the data is not in the list of data entries, query block 216 proceeds to process block 218. If the data is in the list of data entries, query block 216 proceeds to process block 220.

Process block 218 indicates that the data is added to the list of data entries.

Process block 220 indicates that the next record in the database is designated the given record and returns to process block 214.

Figure 10:
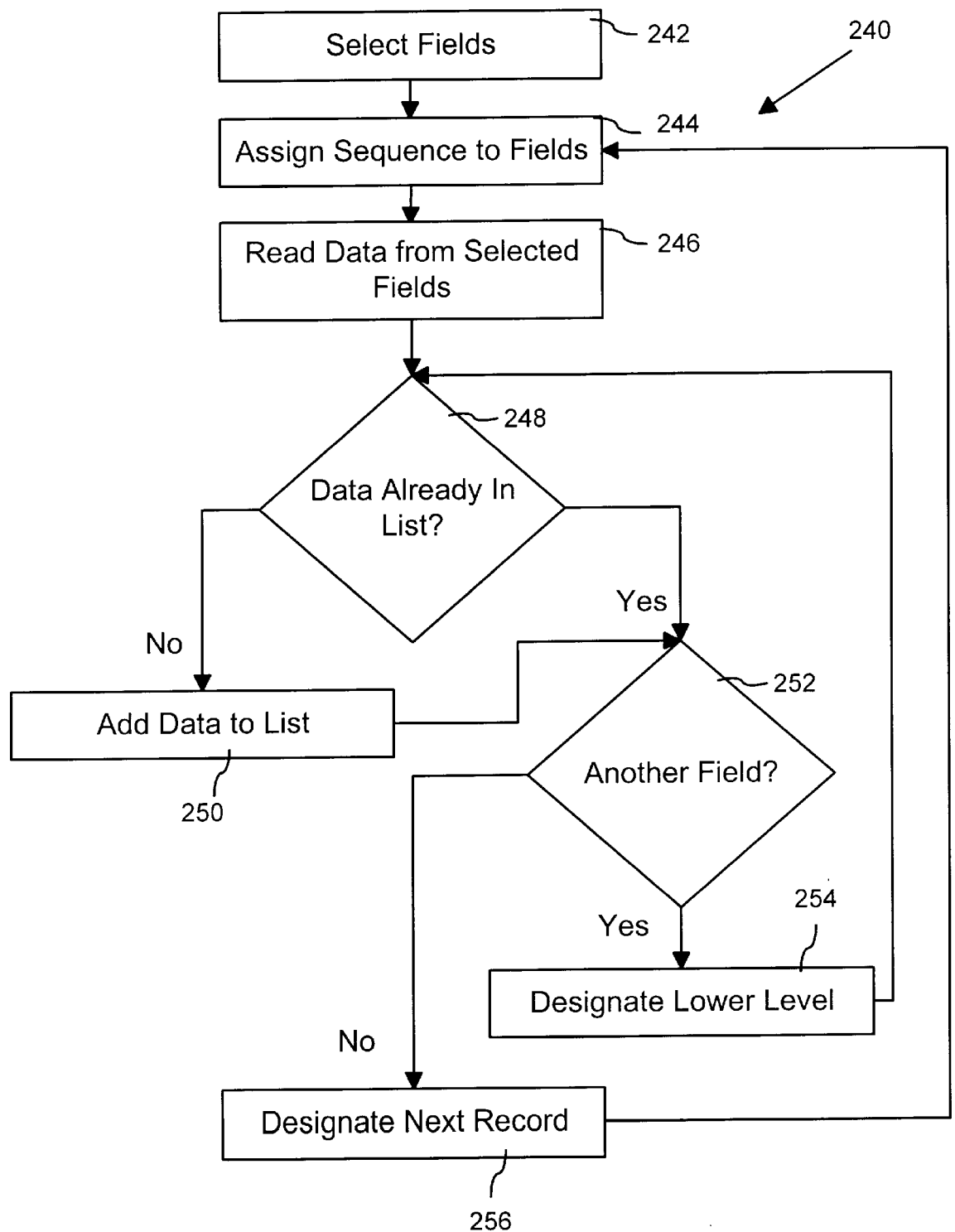
FIG. 10 is a flow diagram illustrating an automatic chart generation process that automatically generates a hierarchical graphical listing or chart from the data entries within a database.

FIG. 10 is a flow diagram illustrating an automatic chart generation process 240 that automatically generates a hierarchical graphical listing or chart from the data entries within a database. Chart generation process 240 is analogous to list generation process 210, except that distilled or compiled lists of the data entries within one or more fields in a database are assigned to hierarchical levels.

Process block 242 indicates that one or more fields of a database table are selected to form the hierarchical basis of a chart. For example, the fields Country, State, and City could be selected.

Process block 244 indicates that the selected fields are assigned a hierarchical sequence (e.g., according to the order they are listed) for generating a chart (e.g., Country, then State, then City).

Process block 246 indicates that the data in the selected fields for a given record is read.

Query block 248 represents an inquiry as to whether the data from the field in the given record corresponding to a given hierarchical level is in a list of nodes for that level compiled from the database. In an initial pass through this process step for a given record, the data corresponding to the highest hierarchical level is considered. If the data is not in the list of nodes, query block 248 proceeds to process block 250. If the data is in the list of nodes, query block 248 proceeds to query block 252.

Process block 250 indicates that the data is added to the list of nodes. Process block 250 proceeds to query block 252.

Query block 252 represents an inquiry as to whether the given record includes another field corresponding to a hierarchically lower level. If so, query block 252 proceeds to process block 254. If not, query block 252 proceeds to process block 256.

Process block 254 indicates that the field in the given record corresponding to the next hierarchically lower level is designated the given hierarchical level, and process block 254 returns to query block 248.

Process block 256 indicates that the next record in the database is designated the given record, and process block 256 returns to process block 246.

Figure 11:
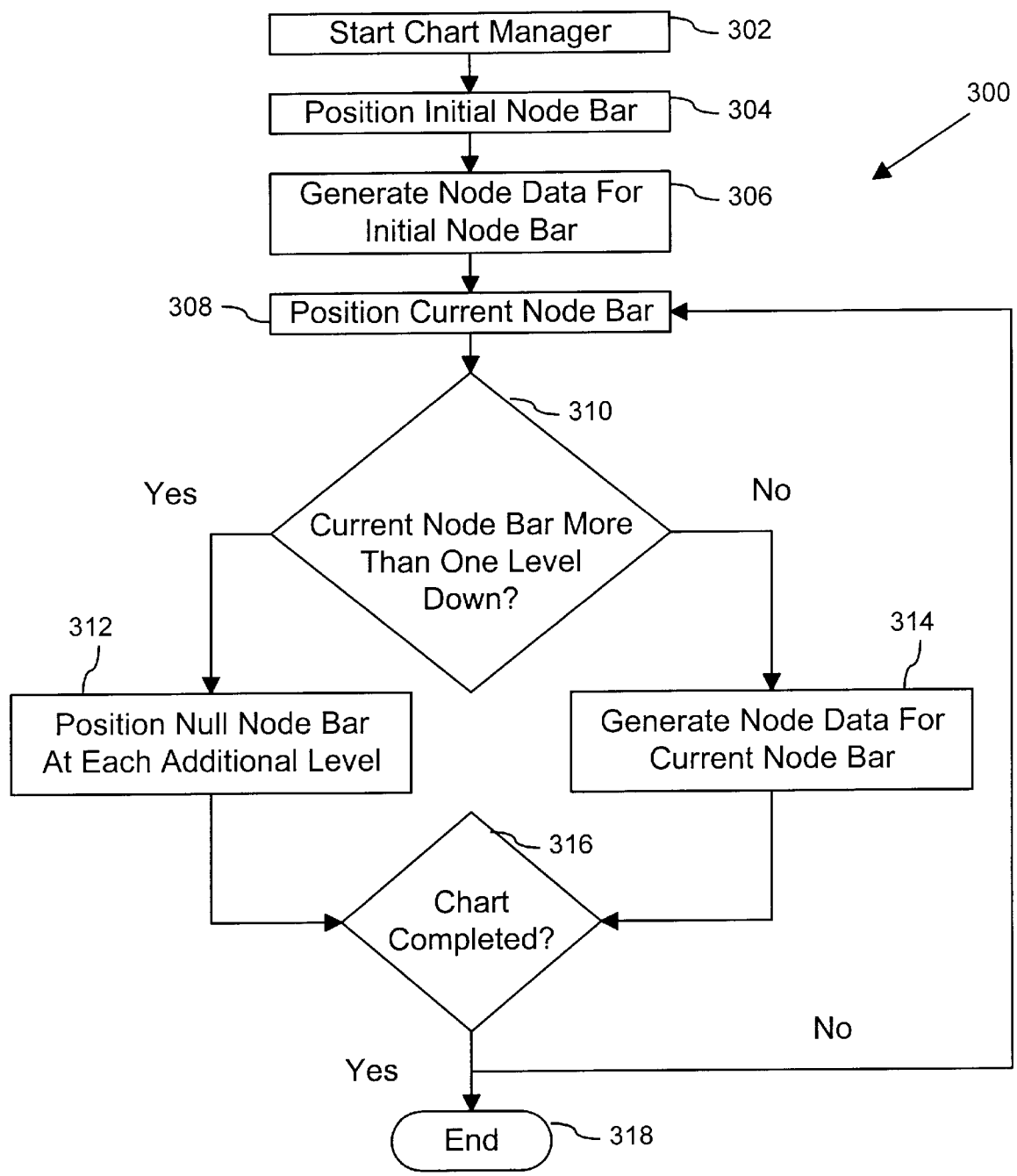
FIG. 11 is a flow diagram of a chart manager process illustrating the operation of the chart manager component.

FIG. 11 is a flow diagram of a chart manager process 300 illustrating the operation of chart manager 76. Process 300 begins with process block 302, which indicates that chart manager 76 with its user interface 90 is activated. User interface 90 includes a source of node lines 98 as described above. The following description refers to nodes 52 and node lines 98 interchangeably.

Process block 304 indicates that a user positions an initial node line 98 to represent a top-level node 52 of a set of nodes in a chart or hierarchical graphical listing.

Process block 306 indicates that chart manager 76 assigns or generates node data for the corresponding node 52. The node data may include the data fields described above with reference to Table 2 and may be generated automatically by software 70 or in accordance with selections entered or made by the user.

Process block 308 indicates that a user positions a current node line 98 to represent another node 52 in the set of nodes in the hierarchical graphical listing.

Query block 310 represents a query as to whether the current node line is positioned by the user more than one level below its immediate parent node line. Whenever the current node line is positioned more than one level below its immediate parent node line, query block 310 proceeds to process block 312. Otherwise query block 310 proceeds to process block 314.

Process block 312 indicates that a null node 100 is positioned at each level between the current node line and its immediate parent node line.

Process block 314 indicates that chart manager 76 assigns or generates node data for the node corresponding to the current node line. The node data may include the data fields described above with reference to Table 2 and may be generated automatically by software 70 or in accordance with selections entered or made by the user.

Query block 316 represents a query as to whether the user has completed defining the chart. The user may indicate that defining of the chart is completed by entering a particular command (e.g., activating a graphical SAVE button) or by closing chart manager 70. The user may indicate that defining of the chart is not yet complete by selecting another bar node for positioning to represent another node in the chart. Whenever the user has not yet completed defining the chart, query block 316 returns to process block 308 for processing a new current node line. Otherwise query block 316 proceeds to end block 318.

The generation of chart definition files is described with reference to use of chart manager 76 by a user. It will be appreciated, however, that chart definition files may be generated by programmed operation of a computer with reference to predetermined data files. Once a chart definition file is established, computer software of the present invention is able to draw or render a corresponding chart such as chart 50 in FIG. 2A. As described in greater detail below, the chart represented by a chart definition file may be rendered in a number of selected formats including the vertical chart format FIG. 2A.

Figure 12A:
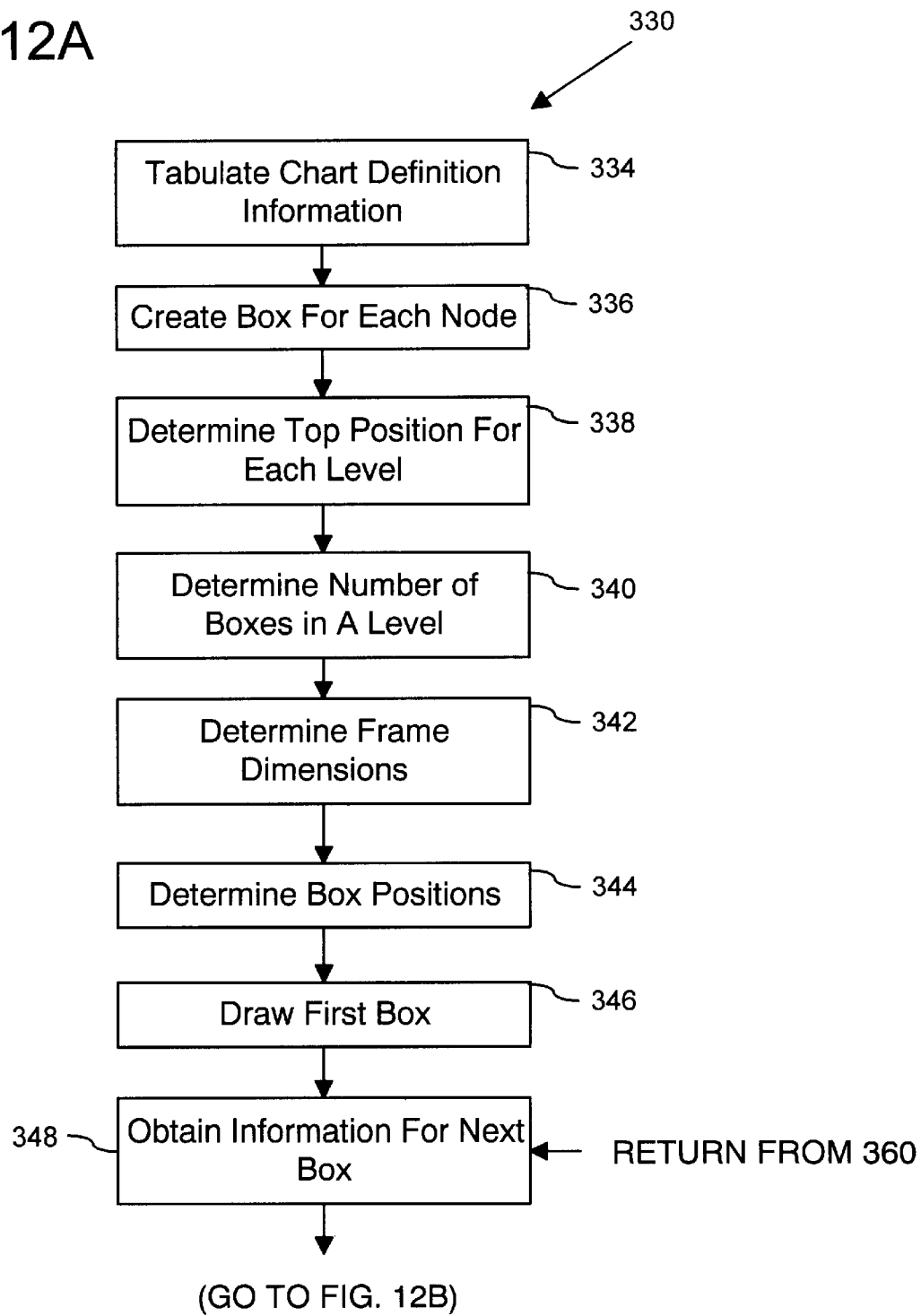
FIGS. 12A and 12B are a flow diagram of a chart drawing process for drawing or rendering a hierarchical graphical listing or chart.
Figure 12B:
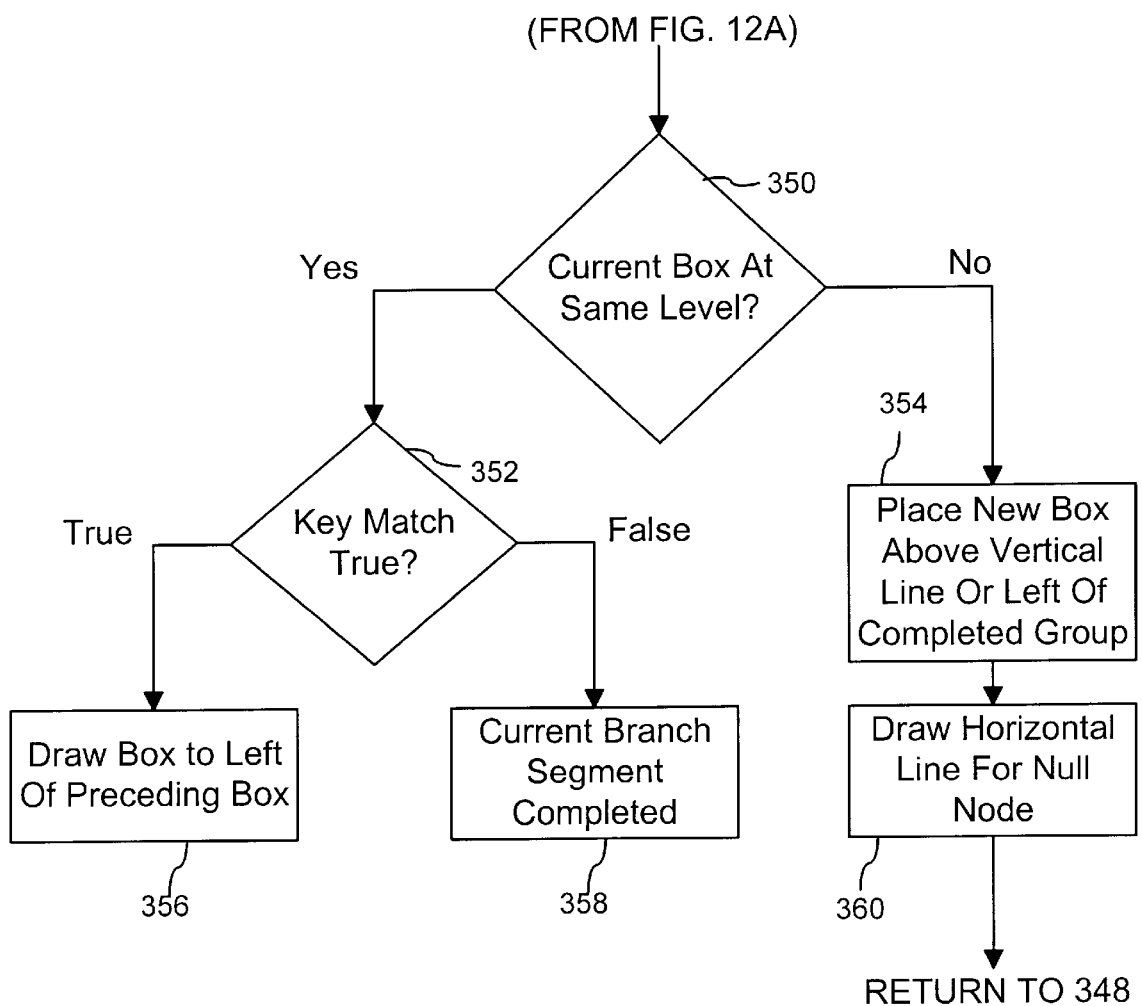

FIGS. 12A and 12B are a flow diagram of a chart drawing process 330 illustrating operation of chart renderer 72 in drawing or rendering in a vertical chart format a chart such as chart 50 of FIG. 2A. In accordance with aspects of this invention the vertical chart format of chart 50 is one of several chart formats selectable by a user, as described below in greater detail. Accordingly, many steps in chart drawing process 330 are applicable to the rendering or drawing of charts in other formats.

The chart is built using basic graphic objects such as lines, boxes and frames. These can be either drawn using programmed routines or they can be standard objects provided with languages such as Visual C++, Visual Basic, Delphi and others. A frame is the display area (e.g., frame 232 in FIG. 2A) within which the chart is drawn. The frame has a vertical height and horizontal width that are adjustable to accommodate the chart to be drawn. For some charts the frame is capable of displaying a background picture.

Boxes represent chart nodes such as nodes 52 in FIG. 2A. The height and width of the boxes are adjustable to accommodate the style of chart being drawn. The box can also display the text of the node name and in some chart formats a small bitmap or icon picture. Lines are used to connect the nodes and show the relationships between them.

Process block 334 indicates that chart definition information is tabulated to organize the information for rendering the chart. In one implementation, the chart definition information is used to build two tables: a Chart Level Table and a Node Properties Table. The Chart Level Table holds control information for each chart level and includes fields listed in Table 3. The Node Properties Table holds information on each node in the chart and includes the fields listed in Table 4.

TABLE 3

| Field | Description |
| --- | --- |
| Number | Number of nodes at each chart level |
| Box Top Position | The vertical location of nodes at this chart level. (used to draw vertical format charts) |
| Box Left Position | The horizontal screen location of nodes at this chart level. (used to draw horizontal charts, which are described below) |

TABLE 4

| Field | Description |
| --- | --- |
| Node Name | See Table 2 |
| Node Level | See Table 2 |
| Node Top | Location of node on the screen. (used to draw pictorial charts, which are described below) |
| Node Left | Location of node on the screen. (used to draw pictorial charts, which are described below) |
| Node Record Number | File location for looking up additional node information |
| Key Match | Indicates whether this node is the last one on this chart branch |

As the node definition records are read during tabulation of the chart definition information, the parent node codes of the current node are compared with those of the previous node and Key Match indicator is set if they are the same. For a current or given node (e.g., node $52_{12}$), a parent node is that node (e.g., node $52_9$) which is at a hierarchically higher level and to which the current node is connected or belongs. A child node is a node (e.g., node $52_{12}$) that is at a hierarchically lower level and that is connected or belongs to the current node (e.g., node $52_9$). Immediate children are child nodes (e.g., nodes $52_6$, $52_7$, $52_8$) that are immediately below a parent node (e.g., node $52_5$).

Process block 336 indicates that a box is created to represent each node. Each box is assigned a sequential number that will be used to access the Node Properties Table when a user selects that node, by clicking it with a mouse or using some other selection method.

Process block 338 indicates that the Box Top Position for each level is determined. The Chart Level Table is scanned or parsed and the Box Top Position for each level is computed for the boxes that will be drawn at that level.

Process block 340 indicates that the number of boxes that will be placed across the chart is determined by parsing the Node Properties Table and counting the number of places Key Match is false.

Process block 342 indicates that dimensions are determined for the frame within which the chart is to be rendered (e.g., frame 232). The determination is made by using the number of levels in the chart, the height of a box, and the vertical gap between boxes to compute the height and by using the number of boxes that will be placed across the chart, the width of a box, and the horizontal gap between boxes to determine the width.

Process block 344 indicates that the positions of the boxes in the frame are determined, starting at the lower right-hand corner. This is done by starting at the end of the Node Properties Table (the bottom of the chart) and stepping up through the table.

Process block 346 indicates that the first box is drawn or placed in the right-most position in the frame, and based on the node's chart level, its Box Top Position is taken from the Chart Level Table.

Process block 348 indicates that the Node Properties Table information for the next box is obtained.

Query block 350 represents a query as to whether the current box or node is at the same level as the previous one. If the current box or node is at the same level as the previous one, query block 350 proceeds to query block 352. If the current box or node is not at the same level as the previous one, query block proceeds to process block 354.

Query block 352 represents a query as to whether the Key Match of the current box or node is true. If the Key Match of the current box or node is true, query block 352 proceeds to process block 356. If the Key Match of the current box or node is false, query block proceeds to process block 358.

Process block 356 indicates that the box is placed or drawn to the left of the preceding box. As each box is placed, a short vertical line (equal to half the distance of the vertical gap between boxes) is drawn upward from the center to the top of the box.

Process block 358 indicates that the current branch segment is completed, which includes drawing a horizontal line connecting the vertical lines extending from the box tops (in some cases a vertical line projecting from the top of a horizontal line will be connected). In addition, a vertical line equal to half the vertical gap distance is drawn up from the center to the horizontal line.

Process block 354 indicates that the box for the new node is placed either above the new vertical line, if it is the parent node of the current branch, or to the left of the just completed node group if it belongs to another branch.

Process block 360 indicates that a horizontal line is drawn instead of a box whenever a null node is encountered. Process block 360 returns to process block 348.

Chart drawing process 330 draws or renders a vertical format chart according to the present invention. Some charts, however, will be so large because of the numbers of nodes or levels that the complete charts cannot be readily displayed entirely at one time. Partial chart display addresses this problem by displaying a reduced number of levels at a time (e.g., two or three levels rather than the six or more of an exemplary complete chart).

For example, if only three levels are to be displayed at a time, only the top three levels would be displayed when the chart is first drawn. When a node within the displayed area of the chart is selected by a user, that node and two levels of its child nodes will be drawn and replace the initial chart display. This process can be continued to move down through hierarchically lower levels of the chart. To move back up the chart, the top-most node of those displayed would be selected and the parent node and two levels of its child nodes are drawn.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. In a computer readable medium, a global database library data structure representing plural data records that are each data of plural fields and are associated with one or more hierarchical graphical listings having plural nodes at plural levels, the data structure comprising for each record:
    a type field that associates the record with a hierarchical graphical listing and includes an identifier value that uniquely identifies a particular hierarchical graphical listing;
    a definition file that includes the identifier value and plural defining fields that define characteristics of the particular hierarchical graphical listing; and
    generic key fields that associate data in the fields with the levels of the hierarchical graphical listing.

2. The data structure of claim 1 in which the defining fields include a field that identifies nodes and a field that identifies the levels of the nodes in the particular hierarchical graphical listing.

3. The data structure of claim 1 in which the particular hierarchical graphical listing is a chart, the identifier value is a Chart Id value, and the definition file is a chart definition file.

4. The data structure of claim 1 in which at least one of the hierarchical graphical listings represents organizational relationships within an organization.

5. The data structure of claim 1 further comprising one of plural actions associated with selected ones of the nodes.

6. A method of defining a database record, comprising:
    assigning a value to a type field in the database record, the value associating the record with a hierarchical graphical listing having plural nodes at plural levels and the value including an identifier value that uniquely identifies a particular hierarchical graphical listing;
    obtaining the identifier value from a definition file that includes the identifier value and plural defining fields that define characteristics of the particular hierarchical graphical listing; and
    associating plural generic key fields in the database record with levels of the hierarchical graphical listing to link values in the generic key fields with the nodes at those levels.

7. The method of claim 6 in which hierarchical lower levels are subsets of hierarchical higher levels and the generic key fields are associated with the levels of the hierarchical graphical listing proceeding successively from hierarchical higher levels to hierarchical lower levels.

8. The method of 6 further comprising rendering a user interface by which a user first assigns a value to a type field in the database record and then associates plural generic key fields in the database record with levels of the hierarchical graphical listing.

9. The method of 6 in which one or more of the generic key fields in the database record have null associations with levels of the hierarchical graphical listing.

10. The method of claim 6 in which the hierarchical graphical listing represents organizational relationships within an organization.

11. The method of claim 6 in which the hierarchical graphical listing includes plural actions associated with selected ones of the nodes.

12. A method of defining a database record, comprising:
    assigning a value to a type field in the database record, the value associating the record with a hierarchical graphical listing having plural nodes at plural levels and the value including an identifier value that uniquely identifies a particular hierarchical graphical listing;
    obtaining the identifier value from a definition file that includes the identifier value and plural defining fields that define characteristics of the particular hierarchical graphical listing, the defining fields including a field that identifies nodes and a field that identifies the levels of the nodes in the particular hierarchical graphical listing; and
    associating plural generic key fields in the database record with levels of the hierarchical graphical listing to link values in the generic key fields with the nodes at those levels.

13. The method of claim 12 in which hierarchical lower levels are subsets of hierarchical higher levels and the generic key fields are associated with the levels of the hierarchical graphical listing proceeding successively from hierarchical higher levels to hierarchical lower levels.

14. The method of 12 further comprising rendering a user interface by which a user first assigns a value to a type field in the database record and then associates plural generic key fields in the database record with levels of the hierarchical graphical listing.

15. The method of 12 in which one or more of the generic key fields in the database record have null associations with levels of the hierarchical graphical listing.

16. The method of claim 12 in which the hierarchical graphical listing represents organizational relationships within an organization.

17. The method of claim 12 in which the hierarchical graphical listing includes plural actions associated with selected ones of the nodes.

* * * * *